Dec. 1, 1931.

R. STRESAU 1,834,505

ELECTRIC ARC WELDING

Filed Feb. 19, 1930

INVENTOR.
Richard Stresau
BY
ATTORNEY.

Patented Dec. 1, 1931

1,834,505

UNITED STATES PATENT OFFICE

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK

ELECTRIC ARC WELDING

Application filed February 19, 1930. Serial No. 429,595.

This invention relates to electric arc welding and more particularly to the arrangement of the parts to be welded with the backing strip forming the bottom of a welding groove therebetween.

The object of the invention is to provide an arrangement of the parts with respect to the backing strip whereby a more complete fusion of the metal of the parts and the deposited weld metal is obtained.

The invention will be more readily understood by reference to the accompanying drawings, in which.

Figure 1:
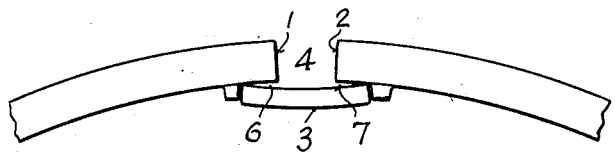
Figure 1 is a diagrammatic end view of the parts showing the arrangement of the same in accordance with the present invention.

The edges 1 and 2 of the plates to be welded are arranged in spaced longitudinal and transverse alignment as shown in Figure 1. A backing strip 3 is arranged beneath the edges and bridging the gap therebetween to form the bottom of a welding groove 4.

In the welding operation, a fusible metallic electrode is preferably employed and the metal thereof is deposited by means of an electric arc which is established between the end of the electrode and the metal at the bottom of the welding groove 4.

Where the edges to be joined are of substantial thickness, it is advisable to deposit the welding metal in layers.

Figure 2:
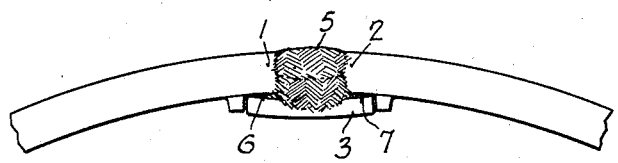
Fig. 2 is a similar view of the finished weld.

The weld shown in Fig. 2 has two layers of deposited weld metal 5 therein.

In accordance with the present invention, the backing strip 3 is formed to provide recesses 6 and 7 below the respective edges 1 and 2.

The backing strip 3 shown in Figure 1, for instance, has a concave top which provides a small recess of approximately one thirty-second of an inch between the backing strip and the respective edges 1 and 2.

In the welding or deposition of the weld metal in the groove 4, the recesses 6 and 7 provide pockets for excessive slag material and also facilitate penetration of the heat of the arc at the lower corners of the edges 1 and 2, whereby a more complete fusion of the deposited metal with the metal of the edges at such corners is obtained.

It has been found that where recesses are not employed below the edges 1 and 2, and between the same and the backing strip, there is a tendency for a lack of fusion of the deposited metal with the metal of the edges at the lower corners of the edges due partially to a lack of penetration of heat and also to a collection of slag in the lower corner of the welding groove. Furthermore, where the backing strip is formed to provide a large recess beneath the edges, there is a waste of weld metal and the metal of the backing strip is often burned through, thereby making the weld defective.

Figure 3:
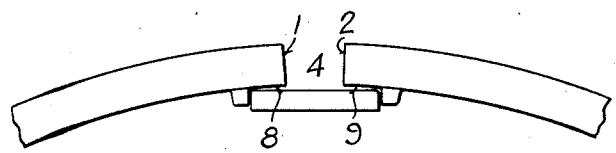
Fig. 3 is a view similar to Figure 1 showing a modified application of the invention.

Instead of employing a concave backing strip to provide the recesses 6 and 7, a straight backing strip may be employed and spaced from the metal of the edges to provide openings 8 and 9, as shown in Fig. 3, corresponding to the recesses 6 and 7 shown in Figure 1.

The weld provided by the present invention has a complete fusion of the deposited metal with the metal of the edges for substantially the full thickness of the edges.

Figure 4:
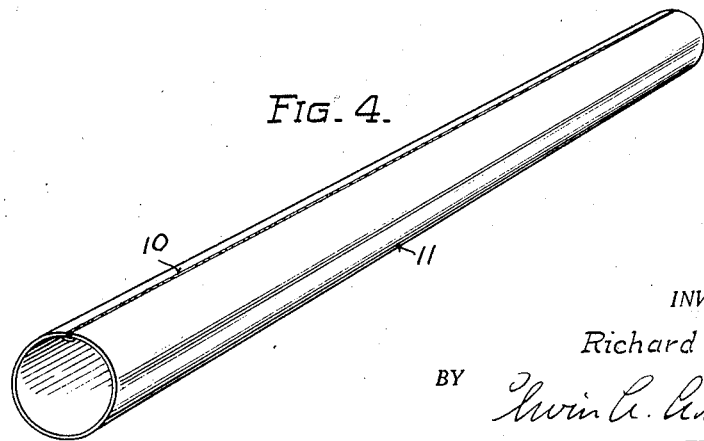
Fig. 4 is a perspective view of a pipe section welded in accordance with the present invention.

In Fig. 4, the invention is shown as applied to the welding of a longitudinal seam 10 in a pipe 11. This application of the invention has particular merit in the construction of oil and gas underground pipe lines which require pipe capable of withstanding high internal pressures, of the order of 15,000 lbs. per square inch unit stress in the metal.

The invention may have various modifications within the scope of the accompanying claims.

I claim:

1. The method of joining two metal parts by electric arc welding which comprises spacing the edges of the parts in transverse and longitudinal alignment for welding, providing a backing strip below the edges to form the bottom of the welding groove therebetween, spacing said backing strip from the metal of the edges to provide an opening beneath the edges for receiving impurities such as slag from the weld metal and for facilitating fusion of the metal of the edges with deposited weld metal, and then depositing welding metal in the space between said edges and fusing the same with the metal of said edges and of the backing strip by means of an electric arc.

2. The method of joining two metal parts by electric arc welding which comprises spacing the edges of the parts in transverse and longitudinal alignment for welding, providing a backing strip below the edges to form the bottom of a welding groove therebetween, providing recesses which form slag pockets between the backing strip and the metal of the respective edges to be welded, and thereafter depositing welding metal in the space between said edges and fusing the same with the metal of the edges and of the backing strip by means of an electric arc.

3. The method of joining two metal parts by electric arc welding which comprises spacing the edges of the parts in transverse and longitudinal alignment for welding, employing a backing strip having a shallow concave recess in its upper surface, positioning said backing strip below the edges to be welded, the recesses therein forming slag pockets beneath the respective edges, and depositing welding metal in the space between said edges and fusing the same with the metal of the edges and with the backing strip by means of an electric arc.

In testimony whereof I have signed my name at Milwaukee, Wisconsin, this 15th day of February, 1930.

RICHARD STRESAU.